United States Patent
Marantz et al.

(10) Patent No.: US 9,286,390 B2
(45) Date of Patent: Mar. 15, 2016

(54) PRESENTATION OF RICH SEARCH RESULTS IN DELINEATED AREAS

(75) Inventors: Daniel Marantz, Bellevue, WA (US); Keith Alan Regier, Kirkland, WA (US); Sarvesh Nagpal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1031 days.

(21) Appl. No.: 13/341,043

(22) Filed: Dec. 30, 2011

(65) Prior Publication Data

US 2013/0174023 A1 Jul. 4, 2013

(51) Int. Cl.
 *G06F 17/00* (2006.01)
 *G06F 17/30* (2006.01)
 *G06F 3/038* (2013.01)
 (Continued)

(52) U.S. Cl.
 CPC .... *G06F 17/30864* (2013.01); *G06F 17/30905* (2013.01); *G06F 3/038* (2013.01); *G06F 3/0481* (2013.01); *G06F 3/0482* (2013.01); *G06F 3/04812* (2013.01); *G06F 17/211* (2013.01); *G06F 17/212* (2013.01); *G06F 17/227* (2013.01); *G06F 17/2247* (2013.01);
 (Continued)

(58) Field of Classification Search
 CPC ..... G06F 17/248; G06F 17/212; G06F 17/24; G06F 17/211; G06F 17/227; G06F 17/2247; G06F 3/04842; G06F 3/04812; G06F 3/0481; G06F 3/038; G06F 3/0482; G06Q 10/10
 USPC .......................................... 715/862, 248, 243
 See application file for complete search history.

(56) References Cited

U.S. PATENT DOCUMENTS

| 5,297,032 A | 3/1994 | Trojan et al. |
| 5,321,750 A | 6/1994 | Nadan |

(Continued)

FOREIGN PATENT DOCUMENTS

| KR | 1020090021524 A | 3/2009 |
| WO | WO 99/26127 | 5/1999 |

OTHER PUBLICATIONS

Zhang, et., "Evaluation and Evolution of a Browse and Search Interface: Relation Browser++", Retrieved at http://digitalgovernment.org/library/library/dgo2005/user_interfaces/zhang_evaluation.pdf>>, The National Conference on Digital Government Research, 2004, pp. 179-188.

(Continued)

*Primary Examiner* — Quoc A Tran
(74) *Attorney, Agent, or Firm* — Dave Ream; Tom Wong; Micky Minhas (57) ABSTRACT

Search results are provided with rich content in defined display areas defined via a border, background, other like graphical elements, or combinations thereof. Within the defined display area, search results content is formatted to evoke a particular theme or concept appropriate for the information identified by the search result. Additionally, within the defined display area, a graphical preview of the search result is provided in an animated manner evocative of user scrolling. Collections of search results are arranged in grids, like tiles. Search results are reviewed on a grid-by-grid basis, with small portions of prior, or subsequent, grids being displayed at the edges of the display, thereby visually indicating that further, or subsequent, grids are accessible. Alternatively, other grids can represent different types of search results. The quantity in a grid, and their size, are dynamically adjusted based on the size of the display.

20 Claims, 5 Drawing Sheets

(51) Int. Cl.

| | |
|---|---|
| G06F 17/22 | (2006.01) |
| G06F 17/21 | (2006.01) |
| G06F 3/0482 | (2013.01) |
| G06F 17/24 | (2006.01) |
| G06F 3/0481 | (2013.01) |
| G06Q 10/10 | (2012.01) |

(52) U.S. Cl.
CPC ............ *G06F17/24* (2013.01); *G06F 17/248* (2013.01); *G06Q 10/10* (2013.01)

(56) References Cited

U.S. PATENT DOCUMENTS

| | | | |
|---|---|---|---|
| 5,339,392 | A | 8/1994 | Risberg et al. |
| 5,819,284 | A | 10/1998 | Farber et al. |
| 5,959,621 | A | 9/1999 | Nawaz et al. |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |
| 6,449,638 | B1 | 9/2002 | Wecker et al. |
| 6,456,334 | B1 | 9/2002 | Duhault |
| 6,510,553 | B1 | 1/2003 | Hazra |
| 6,633,867 | B1 | 10/2003 | Kraft et al. |
| 6,724,403 | B1 | 4/2004 | Santoro et al. |
| 6,832,355 | B1 | 12/2004 | Duperrouzel et al. |
| 6,976,210 | B1 | 12/2005 | Silva et al. |
| 7,028,264 | B2 | 4/2006 | Santoro et al. |
| 7,376,907 | B2 | 5/2008 | Santoro et al. |
| 7,603,349 | B1 | 10/2009 | Kraft et al. |
| 7,657,518 | B2 | 2/2010 | Budzik et al. |
| 7,669,142 | B2 | 2/2010 | Ray et al. |
| 7,933,632 | B2 | 4/2011 | Flynt et al. |
| 7,987,431 | B2 | 7/2011 | Santoro et al. |
| 8,065,603 | B2 | 11/2011 | Gossweiler et al. |
| 2004/0158455 | A1* | 8/2004 | Spivack et al. ............... 704/9 |
| 2005/0216859 | A1 | 9/2005 | Paek et al. |
| 2006/0184512 | A1* | 8/2006 | Kohanim et al. ............ 707/3 |
| 2006/0190833 | A1 | 8/2006 | SanGiovanni et al. |
| 2007/0033169 | A1 | 2/2007 | Friedman |
| 2007/0143264 | A1 | 6/2007 | Szeto |
| 2008/0276185 | A1 | 11/2008 | Pry |
| 2008/0320413 | A1 | 12/2008 | Oshiro et al. |
| 2009/0150792 | A1 | 6/2009 | Laakso et al. |
| 2009/0327270 | A1* | 12/2009 | Teevan et al. ................ 707/5 |
| 2010/0082661 | A1* | 4/2010 | Beaudreau ................ 707/769 |
| 2010/0083155 | A1 | 4/2010 | Farago et al. |
| 2010/0114874 | A1* | 5/2010 | Hansson et al. ............ 707/722 |
| 2010/0241633 | A1* | 9/2010 | Lotito et al. ................ 707/748 |
| 2010/0299343 | A1* | 11/2010 | Ahari et al. ................ 707/759 |
| 2011/0225547 | A1 | 9/2011 | Fong et al. |
| 2011/0246440 | A1 | 10/2011 | Kocks et al. |
| 2012/0047025 | A1* | 2/2012 | Strohman ................ 705/14.71 |
| 2013/0117260 | A1* | 5/2013 | Barrett et al. ............... 707/722 |

OTHER PUBLICATIONS

"International Search Report", Mail Date: Apr. 19, 2013, Application No. PCT/US2012/070429, Filed date: Dec. 19, 2012, pp. 9.

Hisashi, Miyamori, "Towards Integration Services for Heterogeneous Resources: An Integrated Search Engine for Web Content and TV Programs", In: IEEE Conference on Semantics, Knowledge, and Grid (SKG'06), Nov. 2006, pp. 6.

"Supplementary Search Report Issued in European Patent Application No. 12862680.1", Mailed Date: Jul. 13, 2015, 7 Pages.

"First Office Action and Search Report Issued in Chinese Patent Application No. 201210582533.6", Mailed Date: May 21, 2015, 12 Pages.

* cited by examiner

Figure 5

PRESENTATION OF RICH SEARCH RESULTS IN DELINEATED AREAS

BACKGROUND

An ever-increasing amount of information is available through computing devices that are communicationally coupled to one another through computer networks, such as the ubiquitous Internet and World Wide Web. Consequently, users increasingly turn to search engines to find the information for which they are seeking. As will be known by those skilled in the art, such search engines provide searching services whereby they compile indices of the information available through interconnected computing devices, which are communicationally coupled to such search engines, and then let users efficiently search for information that is relevant to a search query provided by that user to such a search engine.

Initially, the results, provided by a search engine, to a query were little more than pointers or identifiers of information that was determined to be relevant to, or responsive to, the query. As the amount of information available through such search engines increased, the chances of a user finding the specific information for which they were searching decreased. As a result, users were often forced to browse through a series of collections of information, such as the ubiquitous webpages, before they found that for which they were searching. More particularly, users would often select one of the results provided by the search engine, download the identified information from another computing device via a network communications, review the downloaded information, determine that the downloaded information was not what the user was searching for, return to the set of results provided by the search engine, select another one of the results provided by the search engine, download that identified information from yet another computing device, and so on. As will be recognized by those skilled in the art, each attempt by the user to access the information that was identified by the search engine as being responsive to the user's query results in the user expending time and resources to obtain such information from another computing device via a network communications.

As search engines became more advanced, and as the quantity of information available through network communications continued to increase, search engines would provide, in response to a user's query, not only a pointer or identifier of information that was determined to be relevant to, or responsive to, the query, but also a "snippet" of textual information from the information that was determined to be relevant to the query to enable the user to more accurately determine whether to download the remainder of the information or whether the information identified as being relevant to, or responsive to, the query was not, in fact, what the user was searching for. Unfortunately, the results to a user's search query are wholly textual and are provided as a list, even when those search results include snippets of textual information from the information identified in the search results as being responsive to the user's search query. Such a textual listing limits the scope of the information that can be provided and also is sub-optimal for modern computing devices, such as those that implement a touch-based user interface. Additionally, the amount, and type, of information on which to base decisions regarding the usefulness and relevance of search results has also increased, and simple textual listings can be inadequate to convey such additional information or how it factors into the results being presented in response to the user's search query.

SUMMARY

In one embodiment, search results can be provided to users such that each search result is in its own well-defined, and delineated area. The individual search result areas can be arranged in a grid, enabling the user to view search results on a grid-by-grid basis. The area of each individual search result can be defined and delineated by background color, border, or other like visual distinctions, or combinations thereof.

In another embodiment, within the defined individual search result areas, a graphical preview of the information identified by that search result can be presented. Such a presentation can entail an animation of the information identified by that search result so as to display a greater amount of the information identified by the search results within the defined individual search result area that can be limited in size. Such an animated graphical preview can be presented one time for each search result within a grid of search results. Subsequently, an icon or other indicator can be presented to enable the user to cause the preview to be animated again, should the user desire to do so.

In a further embodiment, the stylistic formatting of content within the defined individual search result areas can change in accordance with the type of information referenced by the search result. Thus, a search result identifying contact information can be presented utilizing a stylistic formatting evocative of a business card, while a search result identifying news information can be presented utilizing a stylistic formatting evocative of a newspaper.

In a still further embodiment, a small portion of a prior, or subsequent, grid of search results can be displayed at the left or right edges of the display, providing a visual hint to the user that prior, or subsequent, grids of search results can be accessed by, for example, swiping to the left or to the right on a computing device that receives touch input. As a user peruses the provided search results, such perusal can be on a grid-by-grid, rather than on a page-by-page, basis, with prior or subsequent grids being hinted by portions thereof being displayed at the left or right edges of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of content-rich search results within defined display areas. A search engine can identify content that is deemed to be responsive to the search query entered by a user. Each identification of content, or "search result", can be presented to the user within a defined display area that can be defined via a graphical border, graphical background, other like graphical elements, or combinations thereof. Within the defined display area dedicated to each search result, information regarding the search result can be provided in a content-rich manner. Stylistically, a search result's content can be formatted, within its defined display area, to evoke a particular theme or concept appropriate for the information identified by the search result. Thus, for example, contact information can be formatted to evoke a business card layout, while news information can be formatted to evoke a newspaper-article-like layout. Additionally, within the defined display area dedicated to each search result, a graphical preview of the search result can be provided in an animated manner evocative of a user scrolling through such information. In such a manner a greater quantity of information can be displayed within the limited confines of the defined display area dedicated to a search result. Collections of search results, each within their own defined display areas, can be arranged in grids, like tiles. A user can review the search results on a grid-by-grid basis, with small portions of prior, or subsequent, grids being displayed at the edges of the display to provide visual hints to the user that further, or subsequent, grids of search results can be accessed. Alternatively, the other grids of search results can represent different types of search results, such as graphical search results, video search results, and commerce search results, which can then be selected and further explored by the user. The quantity of the search results presented within a grid, and the size of their individual search result display areas, can be dynamically adjusted based on the size of the display, or the size of the area within the display that is allocated to the application program presenting the search results to the user.

For purposes of illustration, the techniques described herein make reference to existing and known networking infrastructure, such as the ubiquitous Internet and World Wide Web (WWW). Such references, however, are strictly exemplary and are not intended to limit the mechanisms described to the specific examples provided. Indeed, the techniques described are applicable to any environment within which information is searched for and the information deemed responsive is provided in the form of search results.

Additionally, for purposes of illustration, the techniques described herein are described within the context of existing searching mechanisms implemented by existing Internet and WWW search engines, namely the generation of search results, in response to a query, that typically comprise an identifier, such as a Uniform Resource Locator (URL), of a web page that is deemed to be responsive to the query, in addition to a title or other nominative identification of such a web page and one or more textual "snippets" or quoted portions of selected textual content from that web page. However, the techniques described are applicable to any sort of searching infrastructure or mechanisms for generating search results. For example, the techniques described herein are equally applicable to graphical search results, audio/visual search results, and other like search results.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
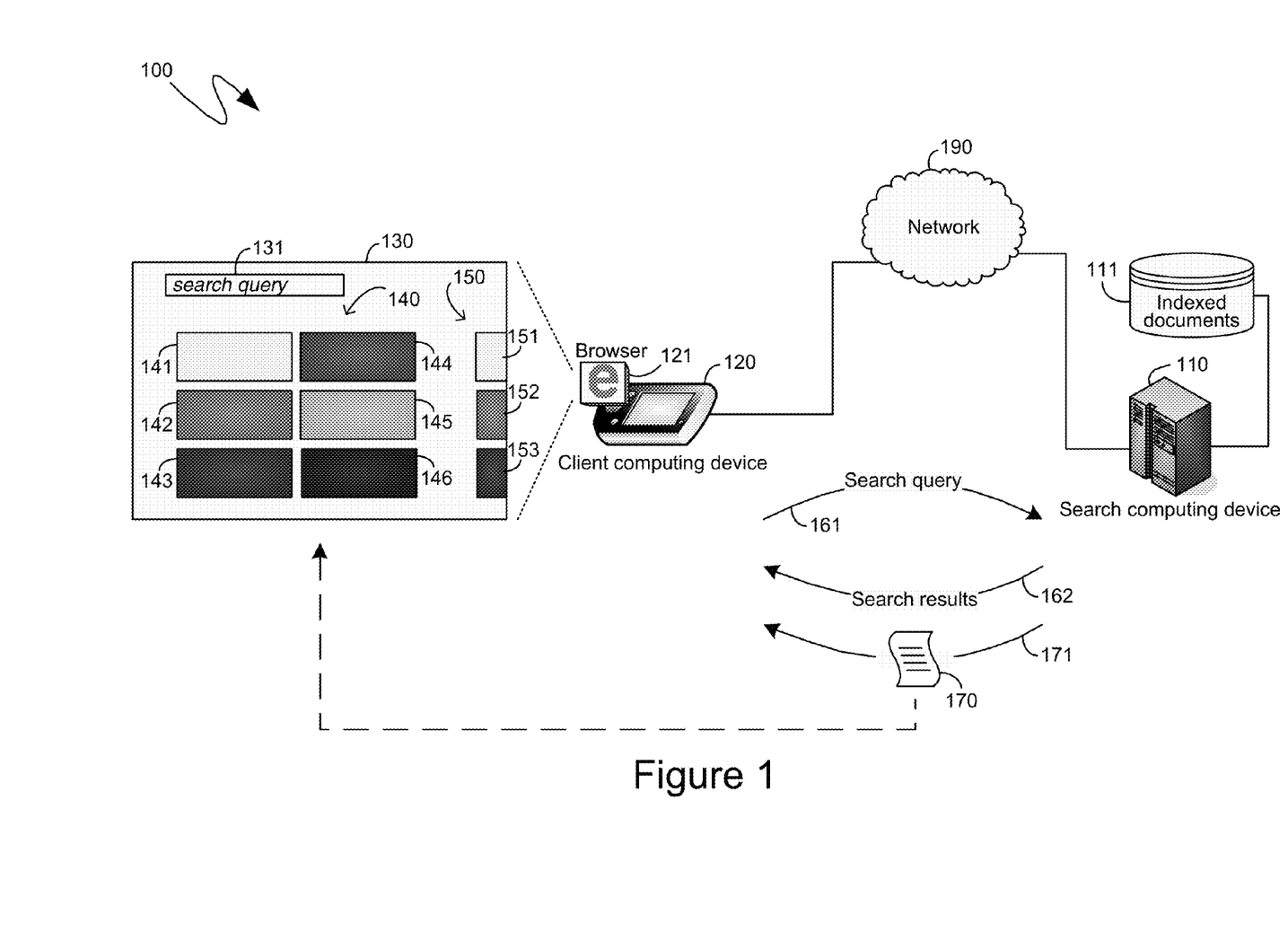
FIG. 1 is a block diagram of an exemplary provision of search results within defined areas.

Turning to FIG. 1, an exemplary system 100 is shown, comprising a computing device 120 that can access content, over the network 190, such as with a network browser application program 121 that can execute, in a known manner, on the computing device 120. For purposes of providing context for some of the benefits enumerated below, the computing device 120 is illustrated as a touch-based computing device, is primary user input is the user's touch on the display of the device. Nevertheless, as will be evident to those skilled in the art from the descriptions below, the mechanisms described are equally applicable to any sort of graphical user interface, and are not limited to touch-based user interfaces.

A search computing device 110 is shown as being communicationally coupled to the network 190 such that it can provide content to the network browser application program 121 executing on the computing device 120 that is, likewise, communicationally coupled to the network 190. More specifically, the search computing device 110 can provide search functionality to the user of the computing device 120, such as through the browser 121. The user of the computing device 120 can provide a search query to the search computing device 110, through the browser 121, and can receive, from the search computing device 110, or, more accurately, from search processes executing on the search computing device 110, identifications of information and content that has been deemed, by the processes executing on the search computing device 110, to be responsive to the search query. As will be recognized by those skilled in the art, the identified information and content that was deemed to be responsive to the user's query can be provided by other computing devices that are communicationally coupled with the computing device 120, and the server computing device 110, via the network 190, though, for illustrative simplicity, they are not shown in the system 100 of FIG. 1.

Typically, to efficiently provide such search functionality, processes executing on one or more search computing devices, such as the search computing device 110, can obtain information and content that is made available by other computing devices that are communicationally coupled to the network 190, and can index such information and content into a store of indexed documents 111 that can be communicationally coupled with the search computing device 110. Processes executing on the search computing device 110 can then reference the indexed documents 111 to identify information and content that is made available by other computing devices, which are communicationally coupled to the network 190, that is deemed to be responsive to a user's query.

In one embodiment, processes associated with the search functionality provided by the search computing device 110 can also generate images depicting some of the information and content, which is made available by other computing devices that are communicationally coupled to the network 190, in the same manner as such information and content would be displayed by, for example, the browser application program 121. Such previews can be generated from the information contained as part of the indexed documents 111, which, as indicated previously, can be communicationally coupled to the search computing device 110 and can be accessed by processes executing thereon.

As indicated previously, initially, a user of a computing device, such as the computing device 120 shown in the system 100 of FIG. 1, can utilize an application program, such as the browser application program 121, executing on the computing device 120, to search for information that can be accessed by the computing device 120, such as from other computing devices as via the network 190. To search for such information, the user can enter a search query, which can be a collection of terms and characters that the user is searching for. The browser application program 121, in executing on the computing device 120, can generate a display 130, such as a window in a window-based graphical user interface, that can comprise an entry mechanism 131 through which a user can enter a search query, which the browser application program 121 can communicate to a search computing device, such as the search computing device 110, as illustrated by the communication 161.

In response, processes executing on the search computing device 110 can reference the search index 111 and can, thereby, identify information, typically provided by other computing devices that are communicationally coupled to the network 190, that is deemed to be responsive to the user's query. An identification of such responsive information can be returned, by the search computing device 110, to the client computing device 120, as illustrated by the communication 162. Such information can then be received by the browser application program 121 executing on the computing device 120 and can be presented to the user, such as through the display 130 being generated by the browser application program 121.

In one embodiment, processes executing on the search computing device 110 can identify the type of browser application program 121, executing on the client computing device 120, that submitted the search query 161 and, can, if the browser application program 121 is an appropriate, or compatible, browser application program, provide scripts 170, or other like computer-executable instructions, that can enable the browser application program 121 to present the search results provided via the communication 162 in defined display areas, such that each search result is displayed within its own defined display area that is unique to that search result and separate and apart from the defined display areas of other search results, and within which the search result can be presented in a content rich manner. For example, as illustrated by the system 100 of FIG. 1, the browser application program 121 can generate a display 130, within which search results are displayed, each within its own defined display area. An initial set of search results can be displayed in the defined display areas 141, 142, 143, 144, 145 and 146 that can be arranged in a grid 140. A subsequent set of search results can also be arranged in a grid 150, comprising the defined display areas 151, 152 and 153, a portion of which can be displayed at the sides of the display 130. By displaying such a portion, the user can be informed that additional grids, such as the grid 150, exist and can be accessed by the user by, for example, generating a right-to-left "swipe" touch input, thereby bringing the grid 150 into prominence in the display 130.

Because each of the search results can be presented within the defined display area, such as the display areas 141, 142, 143, 144, 145 and 146, the content within those display areas can be rich, and even interactive, without negatively impacting the readability, and presentation of other search results. For example, as will be described in greater detail below, a preview, such as can be generated from the indexed documents 111, can be displayed, temporarily, in one or more of the display areas 141, 142, 143, 144, 145 and 146. For example, after generating the display 130, the browser application program 121, following the instructions of the scripts 170, can initially display a preview of the information identified by the search result displayed in the display area 141. The preview of that information can be displayed in the display area 141 for a temporary period of time, whereupon a preview of the information identified by the search results displayed in the display area 144 could be displayed within that display area. In such a manner previews of the information identified by the search results displayed in the display areas 142, 145, 143 and 146 could be displayed, in like order, such that, at any one point in time, only one of the defined display areas 141, 142, 143, 144, 145 and 146 is actively displaying a preview, thereby preventing the display 130 from becoming overwhelming to a user, and rendering the user incapable of deriving meaningful information therefrom.

Figure 2:
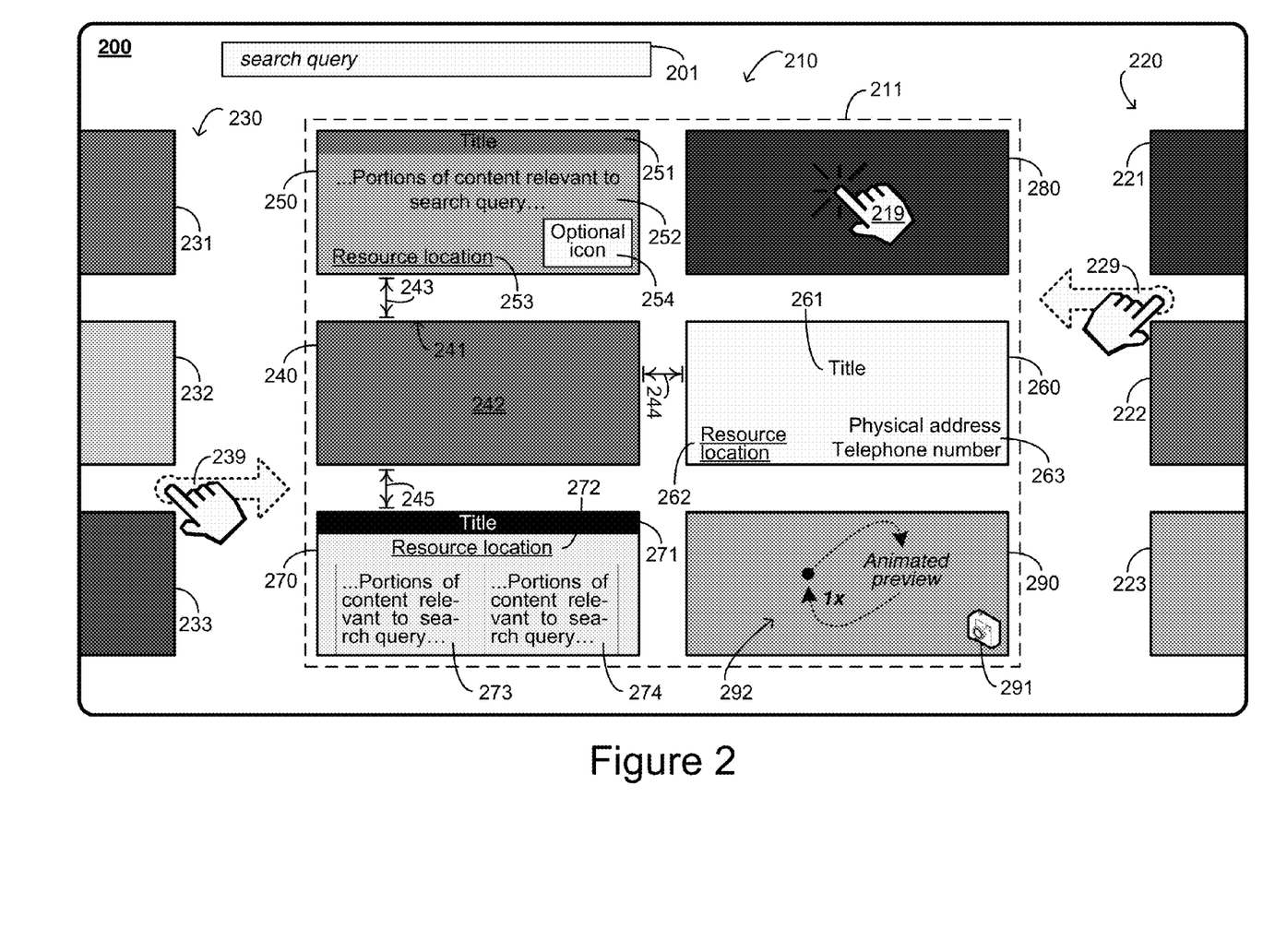
FIG. 2 is a user interface diagram of an exemplary user interface providing rich-content search results within defined areas.

Turning to FIG. 2, the exemplary user interface 200 shown therein provides additional details regarding the presentation of search results within defined display areas such that rich content can be displayed within those defined display areas while still maintaining the presentation of content in a manner that can be easily consumed by users. The exemplary user interface 200 shown in FIG. 2 comprises an entry mechanism 201 through which a user can enter a search query where search results can be displayed, such as in the manner illustrated by the exemplary user interface 200. In one embodiment, the exemplary user interface 200 can further comprise other ancillary elements typically found in user interfaces presented by search engines such as, for example, an indication of the total number of search results that were found, or deemed to be responsive to the user's query, an indication of which collection of search results, from among that total, is currently being displayed to the user, an indication of any filters with content limitations that may have been applicable to the determination and presentation of those search results, and other like ancillary elements. Since such elements are typically found in user interfaces presented by search engines, they were not shown in the exemplary user interface 200 of FIG. 2 to maintain illustrative simplicity and to focus upon the mechanisms and elements described herein. Nevertheless, as will be recognized by those skilled in the art, the exemplary user interface 200 is meant to illustrate specific portions, or aspects, of a user interface through which a user can be presented with search results that have been deemed to be responsive to the user's search query, and is not intended to illustrate every single element of such a user interface.

As shown by the exemplary user interface 200 of FIG. 2, a grid 210 can comprise defined display areas 240, 250, 260, 270, 280 and 290. Each of those defined display areas 240, 250, 260, 270, 280 and 290, individually, can comprise rich content relevant to a single search result. Thus, for example, the defined display area 250 can comprise a title 251 that can be the title of the collection of information, such as, for example, a webpage, that is identified by the search result being identified within the defined display area 250. Additionally, as another example, the defined display area 250 can comprise a snippet 252 that can comprise a textual quotation of textual information from the collection of information that is identified by the search result being identified within the dedicated display area 250. Although not specifically illustrated in FIG. 2, the snippet 252 can, in addition, comprise graphical information, auditory information, or any other like audiovisual information that can be obtained from the collection of information that is identified by the search result presented within the dedicated display area 250. The defined display area 250 can also comprise, as another example, a resource location 253 that can provide a link to the collection of information that is identified by the search result, and an optional icon 254, or other like graphical element, that can serve as an identifier of the collection of information that is identified by the search result, one identifier of a domain of one or more computing devices by which such a collection of information is being made available.

In one embodiment, by presenting search results within defined display areas, such as the defined display areas 240, 250, 260, 270, 280 and 290, users utilizing touch-based user input devices, such as tablet computing devices, smartphone computing devices, and, increasingly, laptop and desktop personal computing devices, can more easily interact with the search results. For example, to select a particular one of the search results presented within the defined display areas 240, 250, 260, 270, 280 and 290, a user utilizing a touch-based input device could simply touch the one of the defined display areas 240, 250, 260, 270, 280 and 290 corresponding to the search results that the user sought to visit, as illustrated by the touch selection action 219 shown in FIG. 2. Because the defined display areas, such as the defined display areas 240, 250, 260, 270, 280 and 290, clearly demarcate an area of the display, a user utilizing a touch-based input device can be provided a measure of certainty regarding where such a user can touch in order to select one or more of the presented search results. More colloquially, the clear democratization of the defined display areas provide the user with certainty as to where one search result ends and another begins, both as to the visual consumption of the search results, and as to interaction therewith, such as through touch selections. In addition, by presenting search results within defined display areas, such as those illustrated in FIG. 2, a larger number of results can be presented within a smaller space because each search result, since it is displayed within a defined display area, is capable of supporting a diverse amount of data that can inform a user and enable the user to determine which search result to select. Combined with the ability to reveal additional information passively through the preview animations that will be described in further detail below, the presentation of search results within defined display areas, such as those described herein, can be particularly advantageous to users of mobile personal computing devices, such as smartphones and tablet computing devices, where, given the smaller display devices associated with such computing devices, the traditional presentation of search results as a vertically oriented textual listing can be inefficient and can require an extended amount of time to peruse. Additionally, such a textual listing of search results can make it difficult for users to compare search results or quickly acquire a broad overview "at a glance".

As illustrated by the exemplary user interface 200 of FIG. 2, a defined display area, such as the defined display areas 240, 250, 260, 270, 280 and 290, can be defined through any number of graphical elements, or combinations thereof. For example, the defined display area 240 is illustrated as being defined via a border 241 and the background 242 that differs, in color or shading, from the background of the other defined display areas 250, 260, 270, 280 and 290 that are presented within the same grid 210 as the defined display area 240. In other embodiments, one or more of a border, such as the border 241, a background color or shading, such as the background 242, or other like graphical elements, or combinations thereof, can be utilized to define a display area within which a search result is to be presented and identified. In yet another embodiment, rather than utilizing a border, such as the border 241, to delineate a display area, the display area could be delineated by the existence of "white space" around the display area, such as the white space 243, 244 and 245 surrounding the display area 240.

As will be recognized by those skilled in the art, search results that identify collections of information that a user has already previously downloaded, or otherwise previously obtained, can be demarcated with a different color of text when presenting such a search result to the user a subsequent time. Because search results can be presented within the defined display areas, such as the defined display areas 240, 250, 260, 270, 280 and 290, graphical indications of search results identifying collections of information that the user has previously obtained need not be limited to merely utilizing a different color text in presenting the search result. Instead, in one embodiment, different colors, or shadings, of the background of one or more of the defined display areas within which search results are presented can be utilized to indicate that the search results identify collections of information that the user has previously obtained. Similarly, different colors, thicknesses, and styles of borders can be utilized to graphically and visually indicate which search results identify collections of information that the user has previously obtained.

In one embodiment, as will be described in detail below, the generation of the defined display areas within which search results are presented, such as the defined display areas 240, 250, 260, 270, 280 and 290 that are shown in the exemplary user interface 200 of FIG. 2, can be directed by scripts or other computer-executable instructions that can be received from a centralized location such as, for example, the search computing device 110 that was shown in the system 100 of FIG. 1. In such an embodiment, such scripts or other computer-executable instructions can comprise flexibility regarding the graphical limitations that they may encounter across a wide variety of computing devices utilized by users including, for example, computing devices that can only display a limited color palette, or computing devices that can only display shades of gray. Consequently, in one embodiment, such scripts, or other computer-executable instructions, can select from one or more predefined sets of background colors, border colors and styles, and the like in order to be able to generate defined display areas that are visually distinct from one another. For example, the background of 242 of the defined display area 240 can be selected to be visually distinct from the background of the defined display areas 250, 260 and 270 that are immediately adjacent to the defined display area 240. A predefined set of background colors can identify degrees of difference between the background colors such that scripts, or other computer-executable instructions, can select background colors for defined display areas based on the background colors selected for other defined display areas that are proximate thereto. For example, selection of the background colors of the defined display areas 240, 250, 260, 270, 280 and 290 shown in the exemplary user interface 200 of FIG. 2 can commence with the selection of a background color for the defined display area 250. Subsequently, when selecting a background color for the defined display area 280, a background color can be selected that comprises an identified degree of difference between it and the background color already selected for the defined display area 250 where the identified degree of difference is greater than a predetermined threshold. In such a manner all of the background colors of, for example, the defined display areas 240, 250, 260, 270, 280 and 290, can be selected to achieve the graphical and visual distinctions desired. In a similar manner, styles and colors of borders can, likewise, be selected from among a predefined set thereof.

In one embodiment, the formatting of content within defined display areas, such as the defined display areas 240, 250, 260, 270, 280 and 290, can be evocative of the type of information that is identified by the search result being presented therein. While the formatting of content within the defined display areas can change, it can be advantageous to maintain common elements that a user is likely to look for and utilize. Thus, as will be shown by the examples described below, each of the defined display areas provided as an example of such differing formatting of content can still comprise a title of the search result being presented, and a location, such as an address, where that search result can be found. In one embodiment, the visual formatting of, for example, such a title and location can be the same across all search results being presented within the defined display areas, such as by utilizing a common typeface or the like, to facilitate the user's identification of such information. As an example of the different formatting that can be applied within defined search areas to provide visual clues as to the type of search result being presented, an exemplary search result can reference a collection of information that identifies a particular individual or business. In such an example, the search result identifying such a collection of information can be presented, within the defined display area, in a manner evocative of, for example, a business card, a Yellow Pages listing, or other like well-known individual or business identifiers. Thus, within the exemplary user interface 200 of FIG. 2, the defined display area 260 can present a search result that identifies a specific business. The title 261 of such a collection of information can then be presented in the middle of the defined display area 260, as opposed to in the manner illustrated by the title 251 of the defined display area 250. Similarly, rather than comprising a snippet 252, the defined display area 260 can comprise specific, identifying information obtained from the information that is referenced by the search results being presented within the defined display area 260, such as, for example, a physical address or telephone number 263. In the example shown in FIG. 2, the physical address and telephone number 263 are presented in a corner of the defined display area 260 to again evoke a business card, or Yellow Pages listing. In a similar manner, the location 262 of the collection of information that is identified by the search results being presented within the defined display area 260 can, likewise, be presented in a corner of the defined display area 260.

As another example, a search result can identify a collection of information that is a press release, news result, or other like announcement. A search result identifying such a collection of information can be stylistically formatted such that its content is evocative of a newspaper, or other like news delivery object. For example, within the exemplary user interface 200 of FIG. 2, the defined display area 270 can present a search result that identifies a collection of information that is a press release, news result, or other like announcement. Within the defined display area 270, the title 271 can be presented in a manner evocative of a title of, for example, a newspaper. Similarly, the location 272 of the collection of information identified by the search result being presented within the defined display area 270 can be presented in a manner evocative of, for example, a subtitle in a newspaper. Snippets 273 and 274, which can have been obtained from the collection of information identified by the search result being presented within the defined display area 270, can be arranged in columns, such as in the manner shown in FIG. 2, to again, evoke a newspaper, or other like news delivery mechanism.

The exemplary user interface 200 of FIG. 2 illustrates six defined display areas, namely the defined display areas 240, 250, 260, 270, 280 and 290, being arranged in a grid 210. In one embodiment, the arrangement of defined display areas within a grid-like structure can dynamically change based on the size of the display on a user's computing device on which such information is being generated and presented, and based on the size of, for example, a window or other like defining structure within which an application program, such as the browser application program 121 shown in the system 100 of FIG. 1, can present information to a user. Thus, for example, the two columns of the grid 210 shown in the exemplary user interface 200 of FIG. 2, namely the columns comprising the defined display areas 250, 240 and 270, and 280, 260 and 290, respectively, could be elongated to each hold more than three defined display areas should the display within which such a grid 210 was being generated have more height than the exemplary user interface 200 shown in FIG. 2. As another example, the grid 210 could comprise three or more columns of defined display areas should the display within which such a grid 210 was being generated be a, for example, widescreen display or other like display or window having sufficient width. Alternatively, the grid 210 could comprise only a single column of defined display areas should the grid 210 be presented on a portrait display, or other small display such as, for example, displays that are typically found on mobile computing devices such as cellular telephones and personal digital assistants.

In one embodiment, search results can be presented within collections of defined display areas, such as the grid 210 which, in the exemplary user interface 200 of FIG. 2, can comprise six defined display areas, namely the defined display areas 240, 250, 260, 270, 280 and 290. Thus, for example, to browse through the search results being presented, the user could view subsequent, or prior, grids of those search results. A subsequent grid 220 of search results is shown in the exemplary user interface 200 of FIG. 2 as being only partially presented on one side of the display. Thus, for example, the defined display areas 221, 222 and 223 of the subsequent grid 220 are only partially displayed within the exemplary user interface 200 of FIG. 2. In such a manner, the user can be presented with a visual hint, signifying to the user that additional grids are available "off-screen" and that the user can access such grids by, for example, directing those grids to prominence within the display. As indicated previously, in one embodiment, the exemplary user interface 200 is presented on a computing device having a touch-based user interface. In such a touch-based system, the user could select the grid 220 to be displayed prominently within the exemplary user interface 200 by, for example, "swiping" from the right-hand side of the display, where only a portion of the grid 220 is shown, towards the left-hand side of the display, thereby "moving" the grid 220 from the right edge of the display into prominence in the user interface 200. Such a swipe 229 is illustrated in the exemplary user interface 200 of FIG. 2 in connection with the subsequent grid 220, a portion of which is shown therein.

In a similar manner, a prior grid 230 can be presented on an opposite side of the display from the subsequent grid 220. In the exemplary user interface 200 that is shown in FIG. 2, the prior grid 230 can comprise defined display areas 231, 232 and 233 of which, again, only a portion is shown within the exemplary user interface 200, thereby providing a visual hint to the user that additional grids are available "off-screen". As with the subsequent grid 220, a user utilizing a touch-based system could access the prior grid 230 by, for example, swiping from the left-hand side of the display, where the small portion of the grid 230 is shown, towards the right-hand side of the display, thereby moving the grid 230 from the left edge of the display into prominence. Such a touch-based user input is illustrated as the swipe 239 that is shown in connection with the prior grid 230 in FIG. 2.

In one embodiment, a user can select, not only additional search results, but also additional types of search results in the manner described above in connection with the swipe actions 229 and 239. For example, the grid 210 can comprise search results identifying primarily textual information, while the grid 220 can comprise search results identifying, for example, images or videos, or other like hypermedia, that is responsive to the user's query, while the grid 230 can comprise search results identifying, for example, shopping or other commerce-related collections of information that are responsive to the user's query. To access, for example, the image search results represented by the grid 220, the user could perform the swipe 229 described previously. Similarly, to access, for example, commerce-related results, the user could perform the swipe 239 that was described previously. To access additional ones of the search results identifying primarily textual information, represented by the grid 210, the user could first direct a selection input to an area surrounding the grid 210, such as is illustrated by the dashed lines 211. In one embodiment, such a selection input anywhere within the area defined by the dashed lines 211 can, instead of selecting a specific one of the search results presented in the defined display areas 240, 250, 260, 270, 280 and 290 of the grid 210 can, alternatively, newly indicate an intent to peruse additional ones of the search results identifying primarily textual information. Thus, in such an embodiment, once the user directed a selection action anywhere within the area defined by the dashed lines 211, the exemplary user interface 200 could change such that the grid 210 did not represent a particular category of search results, but rather the six search results presented within the defined display areas 240, 250, 260, 270, 280 and 290, and the grids 220 and 230, after such a user selection, could be grids that comprised further search results identifying primarily textual information.

In one embodiment, within a defined display area in which a search result is presented, an animated preview of the collection of information itself that is identified by the search result can be presented. Thus, for example, as illustrated within the defined display area 290, an animated preview 292 can be shown. In one embodiment, such an animated preview can be shown for a defined period of time, such as one animation, and then the defined display area 290 can re-display the identifying information that it would have been displaying all along. However, a preview indicator, such as the icon 291, can be presented such that if the user directs input to the icon 291, such as by hovering their cursor over it, the preview 292 can be shown a subsequent time.

Figure 3:
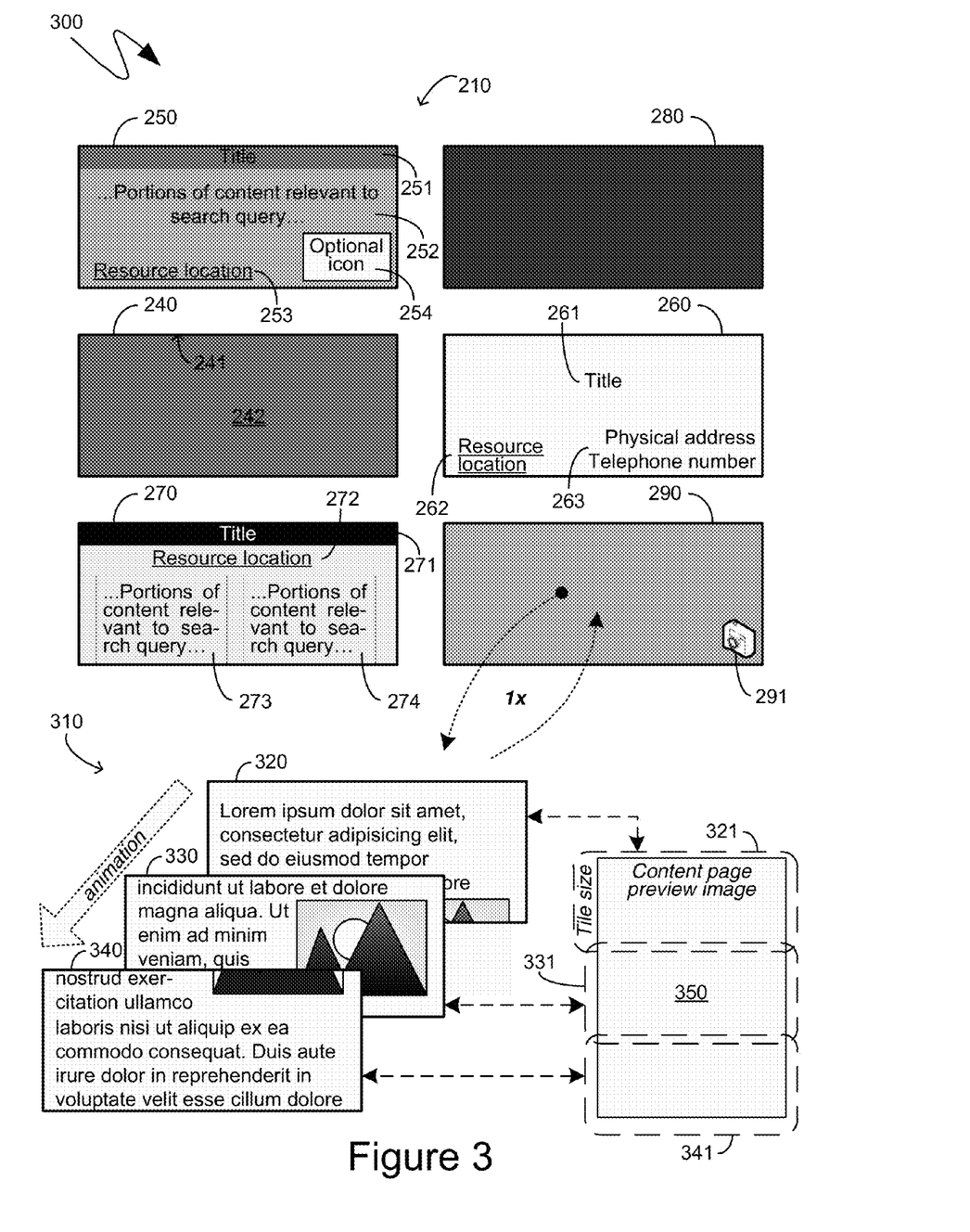
FIG. 3 is a block diagram of an exemplary provision of preview animations within defined search result areas.

Turning to FIG. 3, the system 300 shown therein illustrates such a preview 292 in greater detail. The system 300 of FIG. 3 comprises, for context, the grid 210 that was shown in the exemplary user interface 200 of FIG. 2, and described in detail above. Within the grid 210, any one or more of the defined display areas 240, 250, 260, 270, 280 and 290 can present a preview of the content identified by the search results displayed in those defined display areas. For example, the search result presented in the defined display area 290 can identify a collection of information that can be displayed in the form of one or more pages, such as a webpage. In one embodiment, a preview 350 can exist of at least a portion of the webpage, or other collection of information, identified by the search result presented in the defined display area 290. Such a preview 350 can be an image representing the webpage as it would be displayed on a typical user computing device. More specifically, and as will be known by those skilled in the art, webpages, and other collections of information can be open-ended and can be, at least theoretically, of infinite length. A preview 350 of such a webpage, or other collection of information, can comprise, not a graphical representation of the entire page or collection of information, but rather only so much of the page or collection of information as would typically be displayed at any one time on a typical display device of a typical user computing device. For example, the preview 350 can be a graphical representation of the first portion of the webpage, or other collection of information, that is cut off after 1080 pixels, corresponding to a display of such a webpage, or other collection of information, on an industry-standard 1920-by-1080 pixel display. As another example, the preview 350 can be a graphical representation having only 768 pixels corresponding to the display of the identified collection of information on an industry-standard 1024-by-768 pixel display. In another embodiment, the size of the preview 350 can be dynamically altered by the mechanisms implementing the grid of search results, such that the preview can be larger if the search results are being displayed on a larger screen, and can be correspondingly smaller if the search results are being displayed on a small screen.

The size of the defined display areas, such as the defined display areas 240, 250, 260, 270, 280 and 290 of the grid 210 shown in the system 300 of FIG. 3, can be smaller, often substantially smaller, than the preview 350. Thus, in one embodiment, to display the preview 350 within one of the defined display areas, such as the defined display area 290, an animation 310 can be implemented that can evoke a user scrolling through the preview 350. For example, an initial portion of the preview 350 can be displayed in the defined display area 290 in the form shown by the frame 320. Subsequently, a sequence of frames, such as the frames 330 and 340 can be displayed in the defined display area 290, each showing a progressively lower portion of the preview 350. For example, as illustrated by the system 300 of FIG. 3, the initial frame 320 can correspond to the top of the preview 350, as illustrated by the tile 321 showing how the size of the preview 350 corresponds to the size of a defined display area, such as the defined display area 290. Subsequently, a sequence of frames can be presented, such as the frame 330, corresponding to a lower portion of the preview 350, as delineated by the tile 331. The animation can conclude with the presentation of the frame 340 that can represent the bottom of the preview 350, as illustrated by the tile 341.

As will be recognized by those skilled in the art, the visual effect of the presentation of a sequence of frames, such as the exemplary frames 320, 330 and 340, can be an animation 310 that is evocative of a user scrolling through the preview 350. More specifically, the animation 310 can represent the preview 350 in a sequence of frames, such that each successive frame displays a subsequent, though potentially overlapping, portion of the preview 350. As a result, a user viewing the presentation of such frames, within a defined display area, such as the defined display area 290, would perceive increasingly subsequent portions of the preview 350 within the defined display area 290. As indicated, the effect of the animation 310 within a defined display area, such as the defined display area 290, would be that of the preview 350 being scrolled through the defined display area 290.

In one embodiment, an animation of a preview of content that is identified by a search result can be displayed in an automatic manner in a defined display area in which the search result is presented. Thus, for example, within the specific example of the system 300 of FIG. 3, when the grid 210 is displayed, such as when it is rendered on a display device by, for example, scripts or other computer-executable instructions executing within, or on behalf of, a browser application, a preview, to the extent that it exists or can be generated in a sufficiently efficient amount of time, can be animated within a defined display area, such as the defined display area 250. Once such an animation, analogous to the animation 310 described in detail above, is presented within the defined display area 250, such an animation can end and, in one embodiment, not repeat. More specifically, in such an embodiment, an animation, analogous to the animation 310 described in detail above, can occur once and then stop. Upon stopping, in one embodiment, the preview can not be displayed again automatically within the defined display area 250. Instead, an icon or other indicator, such as the icon 291, can be displayed, providing a mechanism for invoking the animation of the preview again, should it be desirable to do so. And once the presentation of the preview, within the defined display area 250, is completed, the content that is presented within the defined display area 250 can revert back to that shown in the system 300 of FIG. 3, and which was described in detail above, including, for example, the title 251, the snippet 252, the location 253 of the identified information and the like.

Subsequently, once an animation of a preview is presented in, for example, the defined display area 250, and such a presentation ceases, and the content presented within the defined display area 250 reverts back to that displayed prior to the presentation of the preview, another preview of a different collection of information, identified by a different search result, can be presented. For example, within the context of the exemplary system 300 of FIG. 3, once a preview was presented within the defined display area 250, and then stopped being presented therein, another preview, previewing the collection of information identified by, for example, the search result being presented within the defined display area 280, could be then displayed within the defined display area 280. As in the case of the exemplary preview presented within the defined display area 250, the exemplary preview presented within the defined display area 280 can be presented in accordance with the animation 310 described in detail above. Also as in the case of the exemplary preview presented within the defined display area 250, the exemplary preview presented within the defined display area 280 can be presented, in one embodiment, once and then end, and an indicator, or icon, such as the icon 291, can be displayed to enable re-presentation of the preview animation. Once the preview animation presented within the defined display area 280 ceases, and the content within the defined display area 280 reverts back to what was displayed previously, yet another preview animation, this time of yet another, different collection of information identified by yet another, different search result can be presented. For example, after previews have been presented within the defined display areas 250 and 280, and the content within those defined display areas 250 and 280 has reverted back to what was displayed previously, prior to the display of their respective previews, another preview can be presented in, for example, the defined display area 240, previewing the content identified by the search result displayed therein. In such a manner, the presentation of previews of the collection of information identified by search results can proceed through the defined display areas, one-at-a-time, such as, for example, by displaying the previews in the defined display area 250, then the display area 280, then the display area 240, then the display area 260, then the display area 270, and finally the display area 290. As will be recognized by those skilled in the art, other sequences of the presentation of previews can likewise, equally, be implemented.

By presenting a preview of the actual collection of information identified by a search result, the present mechanisms enable a user to minimize the chances of downloading, or otherwise obtaining, the collection of information identified by a search result only to find out it is not, in fact, what the user was searching for. Instead, since the present mechanisms display a preview of the actual collection of information identified by a search result, the user can have a much better idea if the collection of information is what the user was, in fact, searching for. As indicated previously, by minimizing the chances that a user downloads, or obtains, a collection of information that is not what the user was, in fact, searching for, the present mechanisms can improve the efficiency of the user's searching for information.

Additionally, by presenting a preview automatically, at least once, the present mechanisms generate the perception that the defined display area, within which such a preview is presented, is an area that the user can interact with. Consequently, the user can be motivated, by such an automatic preview, to then subsequently initiate the presentation of the preview again, such as by directing user action to a preview-initiating mechanism, such as the icon 291. In one embodiment, if the user "hovers" their cursor, or other user input mechanism, over the, for example, icon 291, a preview of the collection of information identified by the search result that is displayed within the same defined display area as the icon can be presented again. In one embodiment, such a user-activated re-presentation of the preview can, again, present the animation, such as the animation 310, once, and then cease. In another embodiment, if the user continues to direct user action towards the preview-initiating mechanism, the presentation of the preview can repeat over-and-over, or "loop". In yet another embodiment, if the user continues to direct user action towards the preview-initiating mechanism, the preview can be presented one time and then, rather than again display the content that was displayed in the defined display area prior to the presentation of the preview, a frame from the preview, such as a first frame, analogous to the frame 320, shown in the system 300 of FIG. 3, can be continuously presented as long as the user continues to direct user action towards the preview-initiating mechanism. Or alternatively, rather than a first frame, a last frame of the preview animation, analogous to the frame 340, shown in the system 300 of FIG. 3, can remain presented so long as the user continues to direct user action towards the preview-initiating mechanism.

Figure 4:
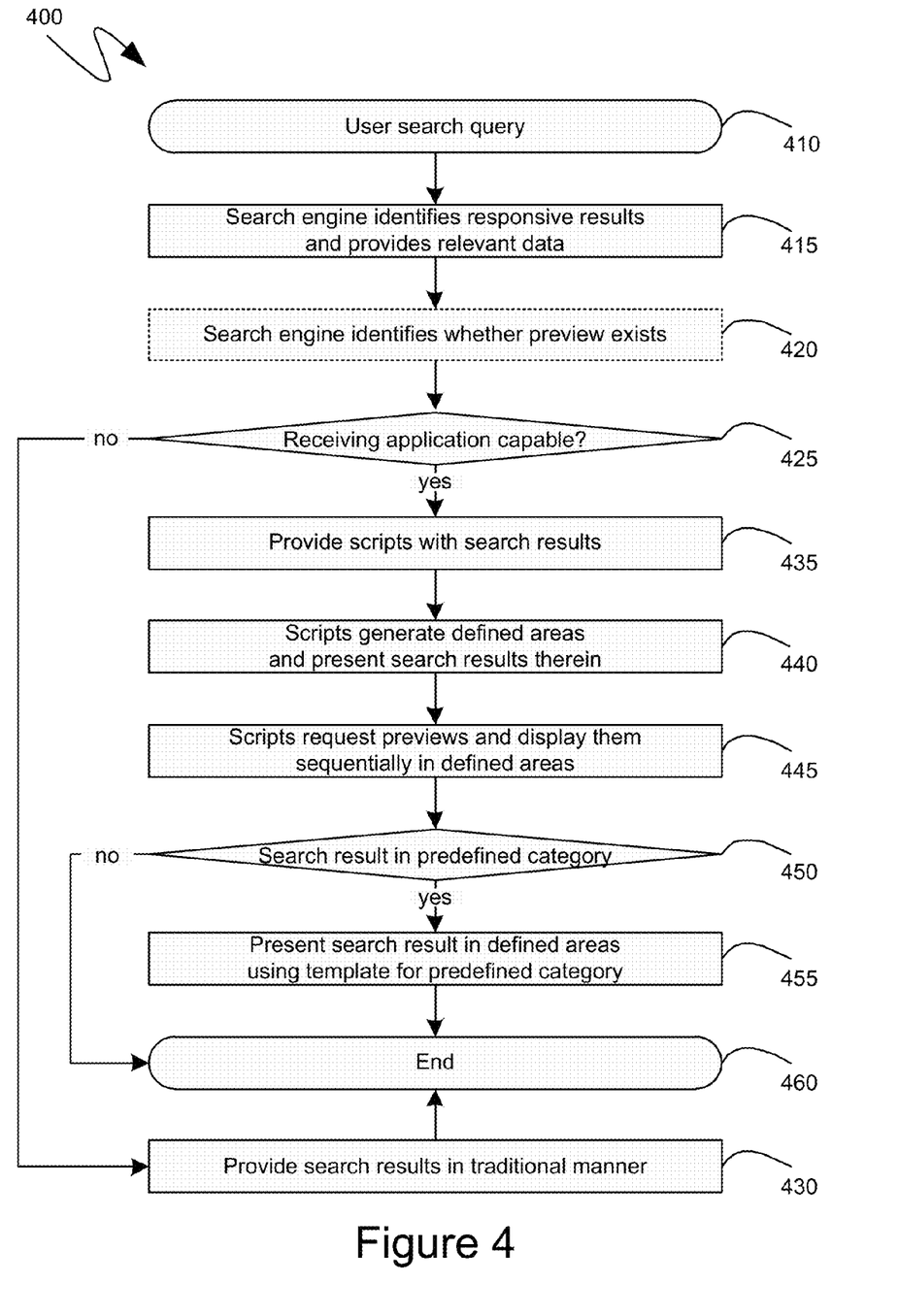
FIG. 4 is a flow diagram of an exemplary provision of rich-content search results within defined areas.

Turning to FIG. 4, the flow diagram 400 shown therein illustrates an exemplary series of steps by which search results can be presented in defined areas with rich content. Initially, as illustrated by the step 410 of the flow diagram 400 shown in FIG. 4, the user can enter a search query comprising those terms for which the user is searching. Subsequently, at step 415, the search engine can identify one or more collections of information that it deems are responsive to the query provided by the user at step 410 and, at step 415, the search engine can provide those search results together with other relevant data. Such relevant data can include an identification of the location of those collections of information that have been deemed to be responsive, titles for those collections of information, snippets from those collections of information, and other like metadata. Additionally, in one embodiment, at step 420, the search engine can identify, for the search results it provided at step 415, whether a preview exists. More specifically, at step 420, the search engine can identify, for the search results it provided at step 415, whether a preview can be generated from the indexed documents described above. Step 420 is illustrated via dashed lines to indicate that it is an optional step.

As will be recognized by those skilled in the art, typically, when submitting information, such as the user query at step 410, an application program, such as a browser application program, can provide identifying information. In one embodiment, at step 425, a determination can be made, such as based on the identifying information that would have been provided by a browser at step 410, whether such a browser, or other providing application program, is capable of implementing the delivery of search results in the manner described in detail above. If, at step 425, it is determined that the browser, or other application program that provided the user search query at step 410, is not capable, then processing can proceed to step 430 at which point the search results generated at step 415 can be presented in a traditional manner. The relevant processing can then end at step 460.

Alternatively, however, if, at step 425, it is determined that the browser, or other application program that provided the user search query at step 410, is capable of presenting search results in the manner described in detail above, then processing can proceed to step 435 where scripts, or other computer-executable instructions, can be provided with the search results. The scripts provided at step 435 can instruct, or inform, the browser, or other like application program, in the generation of grids of defined display areas within which the search results from step 415 can be presented with rich content. At step 440, the scripts that were provided at step 435 can generate defined display areas and present the search results from step 415 therein. As indicated previously, in generating the defined display areas, at step 440, the scripts can select background colors, borders, and other like graphical delineations to differentiate one defined display area from another. Thus, for example, the scripts can be provided with a collection of background colors and with the ability to determine degrees of difference between the background colors so as to select background colors for adjacent display areas in such a manner to emphasize the distinction between. Additionally, as also described above, in generating the defined display areas, at step 440, the scripts can take into account whether the search results presented within those defined display areas identify collections of information that the user has previously obtained, in which case, as an example, a different set of colors or graphical styles can be utilized for the generation of the defined display areas to indicate, to the user, that the collections of information identified by those search results have been previously viewed by the user.

Additionally, at step 440, once the scripts, or other computer-executable instructions that were provided at step 435, complete the generation of the defined display areas, they can display at least a portion of the search results generated at step 415 therein. For example, the defined display areas can be arranged like tiles in a grid, such that a first collection of search results from step 415 are presented within a first grid, and subsequent search results are presented in subsequent grids that the user can access by, for example, swiping to one side or the other to slide a currently presented grid away and bring into prominence another grid of search results.

As part of the presentation of search results within the defined display areas, at step 445, previews of one or more of the collections of information identified by the search results can be requested to be displayed within the defined display areas. In one embodiment, if step 420 was performed, then, at step 445, the previews can be requested only for those collections of information for which it was indicated, at step 420, that such previews existed. In an alternative embodiment, if step 420 was not performed, then, at step 445, previews can be requested for all of the search results, or, more efficiently, only for those search results that are currently being displayed to the user. In one embodiment, if the requested previews are available, they can be provided without delay, while, if the requested previews are not available, they can be generated and then subsequently provided. In an alternative embodiment, however, if the requested previews are not available, then an indication of their unavailability can simply be provided and no preview can be displayed for those search results.

Subsequently, at step 450, a determination can be made as to whether a search result identifies a collection of information that is in a predefined category. For example, a search result may identify a collection of information identifying an individual, retail establishment, or other business. As another example, a search result may identify a collection of information that is a news article, press release, or other like announcement. Other categories, such as collections of information directed to movies, encyclopedias, products and the like can likewise be defined. If, at step 450, it is determined that the collection of information identified by the search result is not in one of the predefined categories, then no further steps can be performed and the relevant processing can end at step 460. Conversely, if, at step 450, it is determined that the search result identifies a collection of information that can be categorized in a predefined category then, at step 455, the presentation of the search result in the defined areas, such as was performed at step 440, can be performed using the template for the predefined category that was determined at step 450. In one embodiment, an identification of such predefined categories of information, as well as the stylistic and formatting templates to be utilized therewith, can be provided with the scripts or other computer-executable instructions provided at step 435. Subsequently, the relevant processing can end at step 460.

Figure 5:
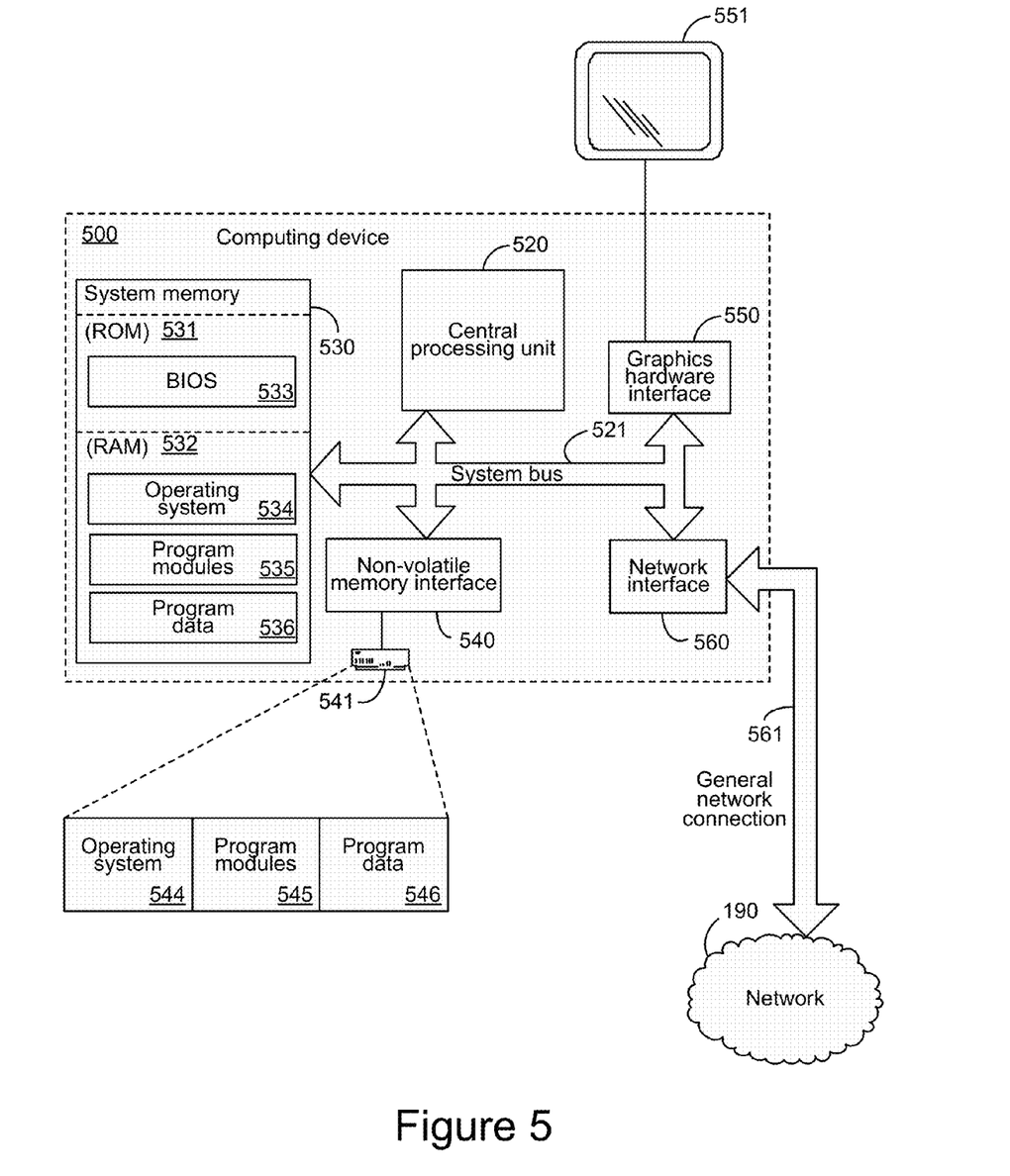
FIG. 5 is a block diagram of an exemplary computing device.

Turning to FIG. 5, an exemplary computing device 500 for implementing the above-described mechanisms is illustrated. The exemplary computing device 500 can be any one or more of the computing devices referenced above, such as those illustrated in FIG. 1, including, for example, the computing devices 110 and 120, whose operation was described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of obscured content in the situations described in detail above. The graphics hardware can include, but is not limited to, a graphics hardware interface 550 and a display device 551. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536, which can include the above referenced network browser.

The computing device 500 may also include other removable/non-removable, volatile/nonvolatile computer storage media. By way of example only, FIG. 5 illustrates the hard disk drive 541 that reads from or writes to non-removable, non-volatile media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to a general network connection 561 through a network interface or adapter 560 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above description, mechanisms for providing search results within defined areas that have rich content have been presented. In view of the many possible variations of the subject matter described herein, we claim as our invention all such embodiments as may come within the scope of the following claims and equivalents thereto.

We claim:

1. A computing device comprising:
one or more processing units;
a display device; and
one or more computer-readable storage media comprising computer-executable instructions, which, when executed by the one or more processing units, cause the computing device to:
generate, on the display device, a defined display area for each search result in a first set of search results, the defined display area being visually distinct from other defined display areas;
align, on the display device, the defined display areas for the first set of search results into a grid comprising at least one column;
generate, on the display device, along a first edge, a visual hint of a second set of search results, the visual hint comprising a portion of defined display areas for at least some search results of the second set of search results, the portion hinting that a remaining portion of the defined display areas for the at least some search results of the second set of search results exist, undisplayed, beyond the first edge;
generate, on the display device, wholly within at least some of the defined display areas for the first set of search results, at least one of: a preview of information that is identified by a search result of the defined display area within which the preview is generated and a formatting of content in accordance with a category of information that is identified by the search result of the defined display area within which the formatting of content is performed;
detect a user input directed to the visual hint of the second set of search results;
regenerate the defined display areas for the first set of search results so as to generate, along a second edge, opposite the first edge, a portion of defined display areas for at least some search results of the first set of search results, hinting that a remaining portion of the defined display areas for the at least some search results of the first set of search results exist, undisplayed, beyond the second edge; and
regenerate the portion of defined display areas for the at least some search results of the second set of search results, the regenerating comprising generating a defined display area for each search result in the second set of search results, the defined display areas for the search results in the second set of search results being visually distinct from all other defined display areas.

2. The computing device of claim 1, wherein at least some of the defined display areas for the first set of search results are defined by a border.

3. The computing device of claim 1, wherein at least some of the defined display areas for the first set of search results are defined by a background color of the defined display areas, each defined display area for the first set of search results having a different background color than adjacent defined display areas.

4. The computing device of claim 1, wherein the computer-executable instructions that cause the computing device to align the defined display areas for the first set of search results into the grid comprising at least one column, comprise computer-executable instructions, which, when executed by the one or more processing units, cause the computing device to align the defined display areas for the first set of search results into a grid comprising a dynamic number of columns dependent upon a smaller of: a size of the display device of the computing device or a window, displayed on a portion of the display device, that is associated with the computer-executable instructions.

5. The computing device of claim 1, wherein the user input directed to the visual hint of the second set of search results is a user swipe from the first edge along which the portion of the defined display areas for the second set of search results are displayed and towards the a second edge, opposite the first edge.

6. The computing device of claim 1, wherein the second set of search results are search results identifying a different type of information than the first set of search results.

7. The computing device of claim 1, wherein the computer-readable storage media comprise further computer-executable instructions, which, when executed by the one or more processing units, cause the computing device to: generate, on the display device, along the second edge opposite the first edge, a second visual hint of a third set of search results, the second visual hint comprising a portion of defined display areas for at least some search results of the third set of search results, hinting that a remaining portion of the defined display areas exist, undisplayed, beyond the second edge.

8. The computing device of claim 1, wherein the computer-executable instructions that cause the computing device to generate the preview of information that is identified by a search result, comprise computer-executable instructions, which, when executed by the one or more processing units, cause the computing device to animate the preview of the information by sequentially displaying a succeedingly subsequent portion of the preview of the information.

9. The computing device of claim 1, wherein the computer-executable instructions that cause the computing device to generate the formatting of the content, comprise computer-executable instructions, which, when executed by the one or more processing units, cause the computing device to format the content to resemble a business card if the information that is identified by the search result of the defined display area within which the formatting of content is performed is information about a person or business.

10. A graphical user interface physically generated on a physical display device by a computing device for providing a user with rich content search results, the graphical user interface comprising:

multiple defined display areas, one for each search result in a first set of search results, the defined display areas being visually distinct from one another and being arranged in a column;

at least one of: a preview of information, wholly displayed within one of the multiple defined display areas for the first set of search results, that is identified by a search result of the one defined display area within which the preview is displayed and a formatting of content, wholly displayed within one of the defined display areas for the first set of search results, in accordance with a category of information that is identified by the search result of the one defined display area within which the formatting of content is displayed; and a visual hint of a second set of search results, the visual hint comprising portions of defined display areas, arranged along a first edge, for at least some search results of the second set of search results, the portions hinting that corresponding remaining portions of the defined display areas for the at least some search results of the second set of search results exist, undisplayed, beyond the first edge;

wherein, in response to user input directed to the visual hint of the second set of search results:

the multiple defined display areas are changed such that the graphical user interface comprises a portion of defined display areas for at least some search results of the first set of search results are shown along a second edge opposite the first edge, the portion of the defined display areas hinting that a remaining portion of the defined display areas for the at least some search results of the first set of search results exist, undisplayed, beyond the second edge; and the portion of defined display areas for the at least some search results of the second set of search results are changed such that the graphical user interface comprises a defined display area for each search result in the second set of search results, the defined display areas for the search results in the second set of search results being visually distinct from all other defined display areas.

11. The graphical user interface of claim 10, further comprising a border around at least some of the multiple defined display areas for the first set of search results.

12. The graphical user interface of claim 10, further comprising background colors in at least some of the multiple defined display areas for the first set of search results that are different from background colors of adjacent defined display areas.

13. The graphical user interface of claim 10, further comprising a second visual hint of a third set of search results, the second visual hint comprising portions of defined display areas, arranged along the second edge, for at least some search results of the third set of search results, hinting that corresponding remaining portions of the defined display areas for the at least some search results of the third set of search results exist, undisplayed, beyond the second edge.

14. The graphical user interface of claim 10, further comprising an animated preview of the information, the animated preview comprising sequentially displayed succeedingly subsequent portions of the preview of the information.

15. The graphical user interface of claim 10, wherein the formatting of the content resembles a business card if the information that is identified by the search result of the defined display area within which the formatting of content is displayed is information about a person or business.

16. A method of generating a presentation of rich content search results, the method comprising the steps of:

generating, on a display device of a computing device, a defined display area for each search result in a first set of search results, the defined display area being visually distinct from other defined display areas;

aligning, on the display device of the computing device, the defined display areas for the first set of search results into a grid comprising at least one column;

generating, on the display device of the computing device, along a first edge, a visual hint of a second set of search results, the visual hint comprising a portion of the defined display areas for at least some search results of the second set of search results, the portion hinting that a remaining portion of the defined display areas for the at least some search results of the second set of search results exists, undisplayed, beyond the first edge;

generating, on the display device of the computing device, wholly within at least some of the defined display areas for the first set of search results, at least one of: a preview of information that is identified by a search result of the defined display area within which the preview is generated and a formatting of content in accordance with a category of information that is identified by the search result of the defined display area within which the formatting of content is performed;

detecting a user input directed to the visual hint of the second set of search results;

regenerating the defined display areas for the first set of search results so as to generate, along a second edge, opposite the first edge, a portion of defined display areas for at least some search results of the first set of search results, the regenerated portion of the defined display areas hinting that a remaining portion of the defined display areas for the at least some search results of the first set of search results exist, undisplayed, beyond the second edge; and regenerating the portion of defined display areas for the at least some search results of the second set of search results, the regenerating comprising generating a defined display area for each search result in the second set of search results, the defined display areas for the search results in the second set of search results being visually distinct from all other defined display areas.

17. The method of claim 16, wherein the aligning the defined display areas for the first set of search results into the grid comprising at least one column comprises aligning the defined display areas for the first set of search results into a grid comprising a dynamic number of columns dependent upon a smaller of: a size of the display device of the computing device or a window, displayed on a portion of the display device, in which the grid is displayed.

18. The method of claim 16, wherein the user input directed to the visual hint of the second set of search results is
a user swipe from the first edge along which the portion of the defined display areas for the second set of search results are displayed and towards the a second edge, opposite the first edge.

19. The method of claim 16, wherein the generating the preview of information that is identified by a search result comprises animating the preview of the information by sequentially displaying a succeedingly subsequent portion of the preview of the information.

20. The method of claim 16, wherein the generating the formatting of the content comprises formatting the content to resemble a business card if the information that is identified by the search result of the defined display area within which the formatting of content is performed is information about a person or business.

* * * * *